(12) United States Patent
Bates et al.

(10) Patent No.: US 6,184,886 B1
(45) Date of Patent: Feb. 6, 2001

(54) APPARATUS AND METHOD FOR STAGING BOOKMARKS

(75) Inventors: Cary Lee Bates; Brian John Cragun; Paul Reuben Day, all of Rochester, MN (US)

(73) Assignee: International Business Machines Corporation, Armonk, NY (US)

( * ) Notice: Under 35 U.S.C. 154(b), the term of this patent shall be extended for 0 days.

(21) Appl. No.: 09/148,246

(22) Filed: Sep. 4, 1998

(51) Int. Cl.$^7$ .............................. G06F 3/00; G06F 15/16
(52) U.S. Cl. .................... 345/357; 345/333; 345/348; 707/501; 709/217
(58) Field of Search ........................... 345/357, 348, 345/352, 333, 334, 356, 346, 329, 354; 707/501, 513; 709/217, 219, 201, 203

(56) References Cited

U.S. PATENT DOCUMENTS

| | | | |
|---|---|---|---|
| 5,801,702 | * | 9/1998 | Dolan et al. .................... 345/357 |
| 5,914,714 | * | 6/1999 | Brown ............................ 345/357 X |
| 5,917,491 | * | 6/1999 | Bauersfeld ....................... 345/352 |
| 5,918,237 | * | 6/1999 | Montalbano ..................... 707/513 |
| 5,963,964 | * | 10/1999 | Nielsen .......................... 707/501 |
| 6,037,934 | * | 3/2000 | Himmel et al. ................. 345/357 X |

* cited by examiner

*Primary Examiner*—Raymond J. Bayerl
(74) *Attorney, Agent, or Firm*—Robert J. Mauri (57) ABSTRACT

According to a preferred embodiment of the present invention, an apparatus and method for intermediate storage of tentative bookmark information is disclosed. The bookmark staging mechanism of the present invention allows a web user, during a browsing session, to temporarily "stage" or "mark" visited sites as potential bookmarks. At the close of the browsing session, or at some other appropriate time during the browsing session, the user can review the list of staged bookmarks and "promote" any or all staged bookmarks while simultaneously discarding any undesired bookmarks. The promoted bookmarks become part of the user's standard bookmark file and can be accessed at a later time, as desired. In addition, the user has the option of quitting the browser and saving the staging area, with the intermediate or staged bookmarks intact. The user can then return at a later time and continue the same search, using the previously staged bookmarks. This unique process allows a user to maintain a list of high-quality bookmarks that will lead the user back to the sites which are most suited to the user's specific information needs. A user can bookmark any and all promising sites without worrying about the possibility of spending hours deleting bookmarks that ultimately prove less valuable. Similarly, a user can bookmark even less promising sites and, if no better sites materialize during subsequent searching, promote those staged sites to the permanent bookmark file for later use.

51 Claims, 8 Drawing Sheets

APPARATUS AND METHOD FOR STAGING BOOKMARKS

BACKGROUND OF THE INVENTION

1. Field of the Invention

This invention relates generally to computer networks. More specifically, this invention relates to tracking and managing access to informational resources on the World Wide Web.

2. Background Art

The development of the EDVAC computer system of 1948 is often cited as the beginning of the computer era. Since that time, computer systems have evolved into extremely sophisticated devices, and computer systems may be found in many different settings. The widespread proliferation of computers prompted the development of computer networks that allow computers to communicate with each other. With the introduction of the personal computer (PC), computing became accessible to large numbers of people. Networks for personal computers were developed that allow individual users to communicate with each other.

Computer systems typically include operating system software that controls the basic function of the computer, and one or more software applications that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the software applications designed for high performance computer systems have become extremely powerful.

Other changes in technology have also profoundly affected how we use computers. For example, the widespread proliferation of computers prompted the development of computer networks that allow computers to communicate with each other. With the introduction of the personal computer (PC), computing became accessible to large numbers of people. Networks for personal computers were developed to allow individual users to communicate with each other. In this manner, a large number of people within a company could communicate with other computer users in a convenient and efficient manner.

One significant computer network that has recently become very popular is the Internet. The Internet grew out of the modern proliferation of computers and networks, and has evolved into a sophisticated worldwide network of computer systems linked together by web pages that collectively make up the "World-Wide Web", or WWW. A user at an individual PC (i.e., workstation) that wishes to access the WWW typically does so using a software application known as a web browser. A web browser makes a connection via the WWW to other computers known as web servers, and receives information from a web server that is displayed on the user's workstation. Information displayed for the user is typically organized into pages that are constructed using a specialized language called Hypertext Markup Language (HTML). The user can navigate to any page by inputting the address or Uniform Resource Locator (URL) into the web browser. URLs are simply formatted text strings which identify the location of a WWW resource.

Several web browsers have been developed which allow users to traverse the pages of the WWW and store "place holders" to represent the URLs of commonly visited sites or pages. Similar to links, these place holders automatically navigate the user back to frequently visited sites with a simple point and click of the mouse. In the commonly used Netscape Navigator web browser, these place holders are referred to as "bookmarks" and are displayed on a Bookmarks Menu located on the main screen of the web browser. Similarly, Microsoft Internet Explorer also allows the user to define place holders which are referred to as "favorites." Since it would be impractical and impossible to list the exact term used by each web browser to designate these place holders, this specification uses the term "bookmark" to broadly signify all present and future terms used to describe place holders which are capable of automatically retrieving URLs and directing a web browser to the desired site.

Another advantage of using bookmarks is the ability to customize a web browser for an individual user. Each web user can personalize his or her Bookmarks Menu by simply navigating their web browser to a commonly visited WWW site, clicking on the Bookmarks Menu and then clicking on the "Add a Bookmark" tool, or some similar tool. This causes the web browser to automatically add a bookmark for that site to the Bookmarks Menu. The newly defined bookmark then appears on the Bookmarks Menu as either the name of the site or the URL address of the site. The user can easily navigate back to any bookmarked site by simply clicking on the appropriate bookmark listed in the Bookmarks Menu. While the use of bookmarks has simplified the use of the WWW, deciding whether or not to bookmark a site is a decision not to be taken lightly.

Typically, when a user is browsing the WWW to locate information for a specific purpose, they will bookmark a site that contains any information that the user finds valuable. Later, during the session, if the user finds a new site that contains even better information relating to the topic of interest, they will add that new site to the list of bookmarks as well. As can be imagined, over the course of a single browsing session, the user may locate and create bookmarks for a large number of sites which contain similar information. However, not all sites are created equal. Therefore, partway through a browsing session the user may discover a site that was bookmarked during the early part of the search is now less desirable or completely useless when compared with the newer, more up-to-date sites that have been bookmarked. This will mean that the user will probably need to go back and remove the older, less valuable bookmarks from the bookmark list at a later time so that the bookmark file is not overloaded with low-quality sites. Ultimately, deciding which sites to keep and deleting the undesirable sites can become very time-consuming.

Knowing that better sites may be found later and not wishing to spend an inordinate amount of time deleting less desirable bookmarks, the user may choose a different strategy which leads to yet a different problem. During the early stages of a browsing session, the user may come across a site which, while promising, is not quite what the user is looking for. Since the user is convinced that better sites must exist elsewhere on the WWW, they will choose not to bookmark the current site and will move on in search of "greener pastures" in an attempt to reduce the number of redundant or less valuable sites that must be removed later. However, after a sometimes fruitless attempt to find a better site, the user may come to the inescapable conclusion that the previously discarded site was, in fact, the best site or was the only site that had the desired information. However, since the user did not bookmark the earlier site, they have no way of easily returning to the previously visited site and may spend many precious hours, sometimes in vain, tying to rediscover the previously visited site that contained the desired information.

These two related problems make the decision to bookmark a site or not to bookmark a site more challenging than it should be. A user would like to simply find the best sites and bookmark them accordingly. However, since it is impossible to know beforehand which sites will turn out to be the best sites, the user must either bookmark every possible relevant site, and go back and delete the unwanted sites at a later time, or take a chance by not bookmarking a potentially promising site and risk not being able to find it again at a later date. While this current approach is serviceable, it is obviously less than ideal. No matter which course of action a user pursues, there will almost certainly be an element of inefficiency or frustration introduced into the process. In fact, the search for previously visited sites and the constant marking and unmarking of less desirable bookmarks can both become unnecessarily counterproductive and time-consuming for the average user.

As the number of WWW users and the number of useful sites rapidly expand, it will become increasingly important for a web user to be able to use bookmarks to effectively access desired information. Without improvements in the present system of managing bookmark information, the process of selecting optimal bookmark files and maintaining ready access to the most relevant sites for individual WWW user will be less effective than otherwise possible.

SUMMARY OF THE INVENTION

According to a preferred embodiment of the present invention, an apparatus and method for intermediate storage of tentative bookmark information is disclosed. The bookmark staging mechanism of the present invention allows a web user, during a browsing session, to temporarily "stage" or "mark" visited sites as potential bookmarks. At the close of the browsing session, or at some other appropriate time during the browsing session, the user can review the list of staged bookmarks and "promote" any or all staged bookmarks while simultaneously discarding any undesired bookmarks. The promoted bookmarks become part of the user's standard bookmark file and can be accessed at a later time, as desired. In addition, the user has the option of quitting the browser and saving the staging area, with the intermediate or staged bookmarks intact. The user can then return at a later time and continue the same search, using the previously staged bookmarks. This unique process allows a user to maintain a list of high-quality bookmarks that will lead the user back to the sites which are most suited to the user's specific information needs. A user can bookmark any and all promising sites without worrying about the possibility of spending hours deleting bookmarks that ultimately prove less valuable. Similarly, a user can bookmark even less promising sites and, if no better sites materialize during subsequent searching, promote those staged sites to the permanent bookmark file for later use.

The foregoing and other features and advantages of the present invention will be apparent from the following more particular description of the preferred embodiment of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements, and.

BEST MODE FOR CARRYING OUT THE INVENTION

The present invention provides a new method for browsing the WWW and using bookmarks to locate and store references to desirable web pages. The methods of the present invention offer enhanced productivity by increasing the flexibility of any web browser application.

DETAILED DESCRIPTION

Figure 1:
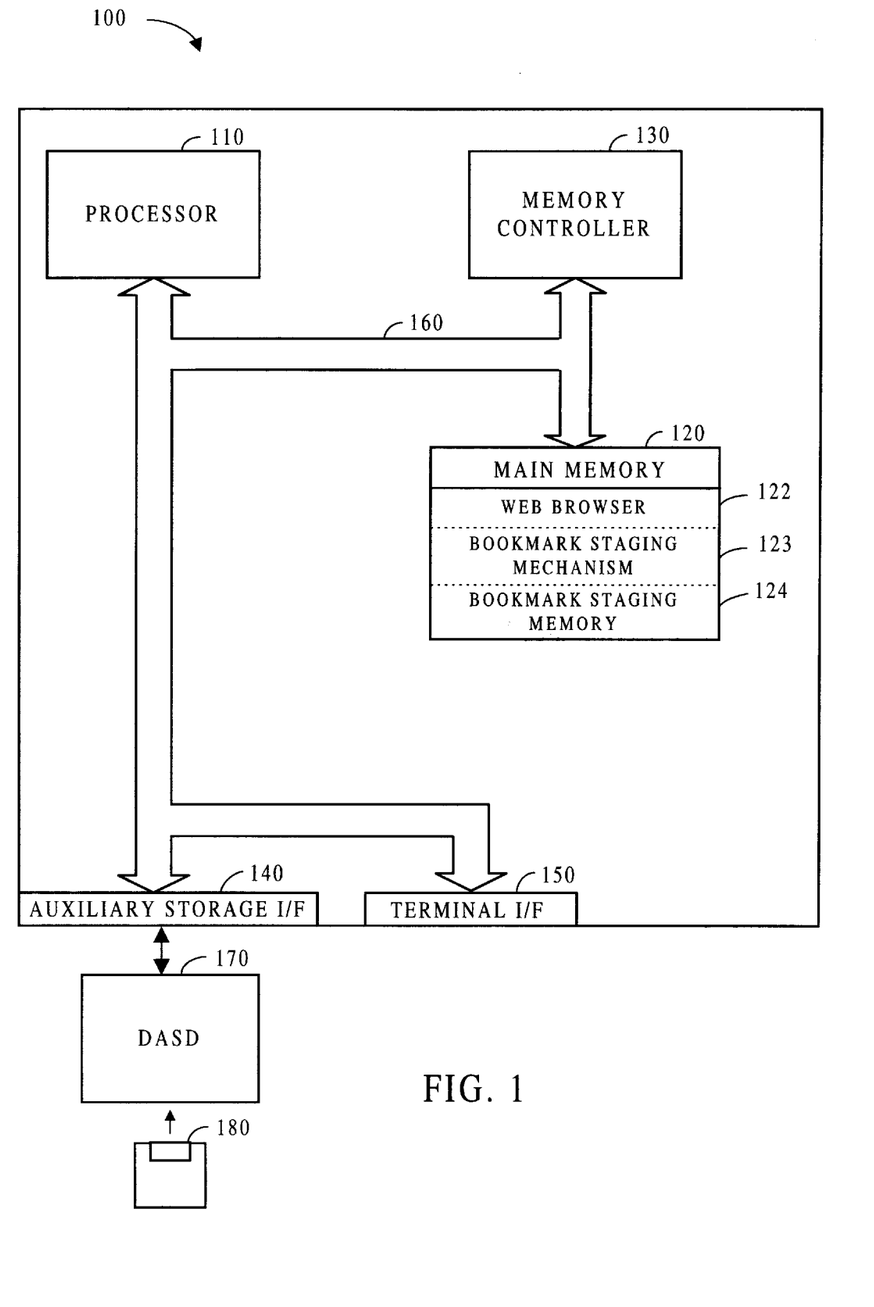
FIG. 1 is a block diagram of a computer system in accordance with a preferred embodiment of the present invention.

Referring now to FIG. 1, a computer system in accordance with a preferred embodiment of the present invention includes: a Central Processing Unit (CPU) or processor 110; a terminal interface 150; an auxiliary storage interface 140; a Direct Access Storage Device (DASD) 170; a floppy disk 180; a bus 160; and a memory 120. In this example, memory 120 includes a web browser 122, a bookmark staging mechanism 123, and bookmark staging memory 124. It should be understood that bus 160 is used to load bookmark staging mechanism 123 into memory 120 for execution. Bookmark staging memory 124 is used to store information about intermediate or staged bookmarks while bookmark staging mechanism 123 is operational. Bookmark staging mechanism 123 and bookmark staging memory 124 are explained in greater detail below.

Processor 110 performs computation and control functions of system 100. Processor 110 associated with system 100 may comprise a single integrated circuit, such as a microprocessor, or may comprise any suitable number of integrated circuit devices and/or circuit boards working in cooperation to accomplish the functions of a central processing unit. Processor 110 is capable of suitably executing the programs contained within memory 120 and acting in response to those programs or other activities that may occur in system 100.

Memory 120 is any type of memory known to those skilled in the art. This would include Dynamic Random Access Memory (DRAM), Static RAM (SRAM), flash memory, cache memory, etc. While not explicitly shown in FIG. 1, memory 120 may be a single type of memory component or may be composed of many different types of memory components. In addition, memory 120 and processor 110 may be distributed across several different computer that collectively comprise system 100. For example, web browser may reside on one computer with $CPU_1$, bookmark staging mechanism may reside on another computer system with a separate $CPU_2$, and bookmark staging memory may reside on a third computer system with a different $CPU_n$. Computer system 100 of FIG. 1 simply illustrates many of the salient features of the invention, without limitation regarding the physical location of processor 110 or memory locations within memory 120.

Bus 160 serves to transmit programs, data, status and other forms of information or signals between the various components of system 100. The preferred embodiment for bus 160 is any suitable physical or logical means of connecting computer systems and components known to those skilled in the art. This includes, but is not limited to, direct hard-wired connections, Internet connections, Intranet connections, fiber optics, infrared (IR) and other forms of wireless connections. It is anticipated that many alternative methods and material for connecting computer systems and components will be readily adapted for use with the present invention. This would include those methods and materials not presently known but developed in the future.

Terminal interface 150 allows human users to communicate with system 100. Auxiliary storage interface 140 represents any method of interfacing a storage apparatus to a computer system known to those skilled in the art. Auxiliary storage interface 140 allows auxiliary storage devices such as DASD 170 to be attached to and communicate with the other components of system 100. While only one auxiliary storage interface 140 is shown, the present invention anticipates multiple interfaces and multiple auxiliary storage devices such as DASD 170. As shown in FIG. 1, DASD 170 may be a floppy disk drive which is capable of reading and writing programs or data on disk 180. DASD 170 may also be any other type of DASD known to those skilled in the art. This would include floppy disk drives, CD-ROM drives, hard disk drives, optical drives, etc. Disk 180 represents the corresponding storage medium used with DASD 170. As such, disk 180 can comprise a typical 3.5 inch magnetic media disk, an optical disk, a magnetic tape or any other type of storage medium.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of a particular type of signal bearing media used to actually carry out the distribution. Examples of signal bearing media include recordable type media such as floppy disks, CD-ROMs and transmission type media such as digital and analog communication links including wireless communications.

Obviously, system 100 will typically include additional components such as a mouse, a keyboard, a network interface, a modem, etc. that allow system 100 to connect to various computer networks and allow the user of system 100 to communicate over a network connection to a network. The use and operability of these various components are well known to those skilled in the art and, accordingly, are not addressed herein.

Figure 2:
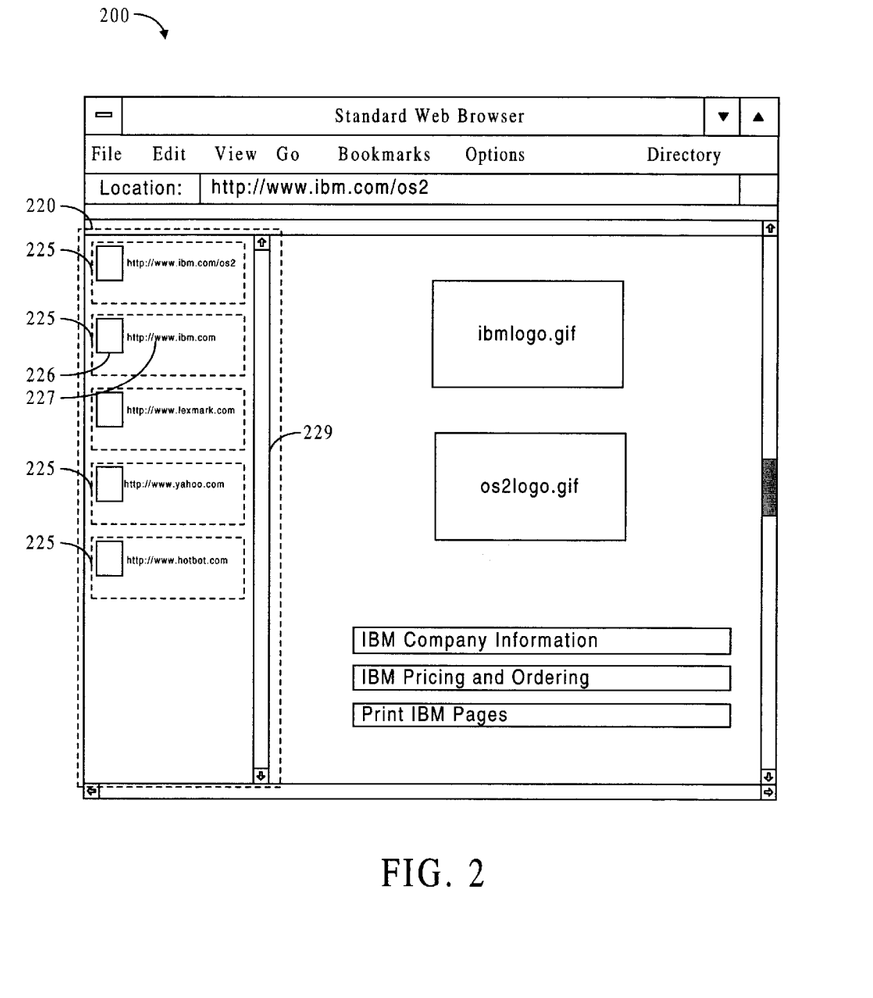
FIG. 2 is a simplified screen shot of a web browser window incorporating a bookmark staging area according to a preferred embodiment of the present invention.

Referring now to FIG. 2, a web browser window 200 incorporates a bookmark staging area 220 in accordance with a preferred embodiment of the present invention. Bookmark staging area 220 includes a series of staged bookmarks 225 and a scroll bar 229. Each staged bookmark 225 includes icon portion 226 and a URL portion 227. Each icon portion 226 is a pictorial representation or "thumbnail" of a staged bookmark 225 which has been placed into bookmark staging area 220 by bookmark staging mechanism 123 as directed by the user. Each URL portion 227 is the URL for the corresponding icon portion 226. Scrollbar 229 is provided to navigate through bookmark staging area 220 when the number of staged bookmarks 225 exceed the display limits of bookmark staging area 220. Scrollbar 229 works in a fashion similar to other window scroll bars provided in other GUI environments. It is important to note that although a URL portion 227 is shown for each icon portion 226, bookmark staging mechanism 123 may be implemented to display the URL portions 227 only upon demand or by a specific user action such as placing the cursor over a given icon portion 226. Alternatively, bookmark staging mechanism 123 may be configured to display the HTML title of the bookmarked WWW page. Various combinations of these URL and title display features will be user-configurable options in the most preferred embodiments of the present inventions.

While web browser window 200 has been used to explain one preferred embodiment of the present invention, those skilled in the art will recognize that many other embodiments with other types of interface elements may be used to provide the same or similar functionality as web browser window 200.

Figure 3:
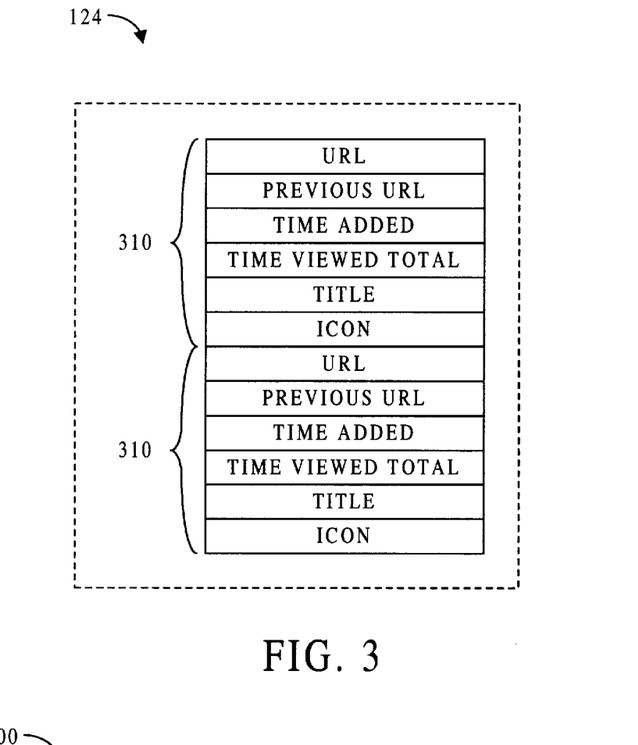
FIG. 3 is a block diagram representation of the contents a memory location for staging bookmarks in accordance with a preferred embodiment of the present invention.

Referring now to FIG. 3, a block diagram representation of one preferred embodiment of bookmark staging memory 124 is illustrated. As shown in FIG. 3, each staged bookmark 225 in bookmark staging area 220 is represented by a bookmark record 310. Each bookmark record 310 contains a series of fields which describe certain characteristics regarding each staged bookmark 225. These characteristics include information such as the URL of the bookmark, the parent URL or URL that was viewed just prior to the staged bookmark represented by the record, time of day the staged bookmark was added to bookmark staging area 220, total amount of time that the web browser user has spent viewing the URL, the title of the page represented by the URL, and the icon for the web page represented by the URL. The parent URL field provides a link to the URL or world wide web page that led to the current world wide web page. Bookmark staging mechanism 123 can timestamp and update the appropriate fields in records 310 by using the system clock for system 100.

While one specific embodiment of records 310 used to store information regarding the bookmarks 225 stored in bookmark staging memory 124 has been described in conjunction with FIG. 3, those skilled in the art will recognize that many variations are possible. Any suitable memory structure known to those skilled in the art will suffice to store and manage staged bookmarks 225. Obviously, other types of information may be included in a given record 310 if desired.

Figure 4:
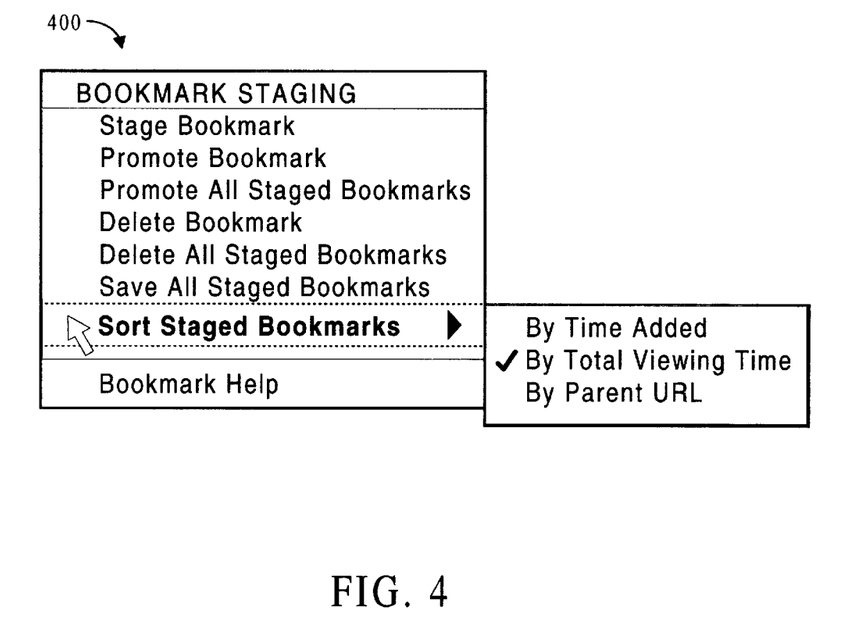
FIG. 4 is a sample pop-up menu for managing staged bookmarks according to a preferred embodiment of the present invention.

Referring now to FIG. 4, a pop-up menu 400 which provides access to the various features of bookmark staging mechanism 123 is illustrated. As is well known to those skilled in the art, a pop-up menu can be implemented in a GUI environment. In this case, the web browser user may click and hold the right mouse button on a two-button mouse to invoke pop-up menu 400. As shown in FIG. 4, pop-up menu 400 allows a user to add a bookmark to staging area 220, quickly and easily promote or delete staged bookmarks and save the staged bookmarks for later access. While various functions of bookmark staging mechanism 123 are illustrated by an implementation of pop-up menu 400, those skilled in the art will understand that the same functions can be easily implemented in other ways such as pull down menus or click and drag operations. In the most preferred embodiments of the present invention, the functions of bookmark staging mechanism 123 will be accessible via pull-down menus, pop-up menus, and click and drag operations.

It should be noted that bookmark staging mechanism 123 may also have more functions than those shown in pop-up menu 400. Specifically, the most preferred embodiments of bookmark staging mechanism 123 provides for the implementation of at least the following functions:

click or drag on a web site URL to add it to bookmark staging area 220;

display a series of staged bookmarks 225 in bookmark staging area 220;

click or drag a staged bookmark to become a standard bookmark;

delete any or all staged bookmarks that are no longer considered relevant;

update a staged bookmark with a more relevant choice by dragging a new bookmark into bookmark staging area 220 and placing it over an existing bookmark, thereby replacing the existing staged bookmark 225 with a new staged bookmark 225;

select several sites within bookmark staging area 220 and promote all staged bookmarks 225 to an existing or new folder with a single click;

click on the icon portion 226 of a staged bookmark 225 to view the full window of the site; and view the title of a site represented by a staged bookmark 225.

This list of features should not be considered exclusive or exhaustive, but is presented to clearly identify several key features that are implemented in bookmark staging mechanism 123.

Figure 5:
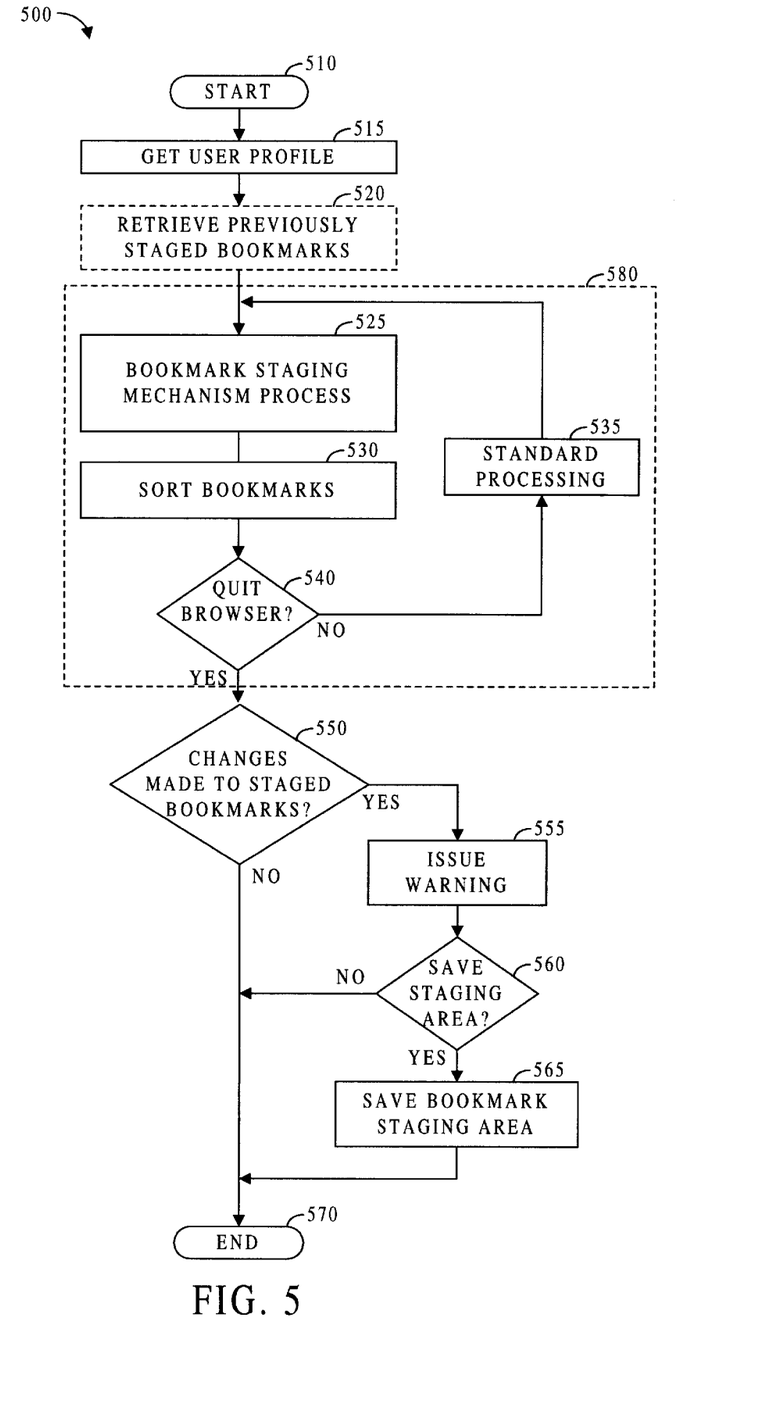
FIG. 5 is a flow diagram of the overall method steps for staging bookmarks in accordance with a preferred embodiment of the present invention.

Referring now to FIG. 5, a general method 500 for implementing the functionality of bookmark staging mechanism 123 is illustrated. According to the preferred embodiments of the present invention, bookmark staging mechanism 123 can be incorporated into any web browser such as web browser 122. When web browser 122 is launched, bookmark staging mechanism 123 will be started (step 510). First, bookmark staging mechanism 123 will retrieve the profile of the user using web browser 122 (step 515). The user profile can be stored in memory 120 and retrieved based on log-in parameters, network identifiers, or other identification techniques well known to those skilled in the art. After obtaining the user profile, bookmark staging mechanism 123 will retrieve any previously staged bookmarks, if they exist (step 520). It is important to note that bookmark staging mechanism 123 can save staged bookmarks between browsing sessions and match previously staged bookmarks to the appropriate user by examining the user profile information obtained in step 515. After retrieving any previously staged bookmarks, bookmark staging mechanism 123 will enter main event loop 580 for web browser 122 and will perform the various bookmark staging update and storage routines of bookmark staging mechanism 123 (step 525). The various capabilities and functionality of bookmark staging mechanism 123 have been introduced above and will be described in more detail in FIG. 6 below. Bookmark staging mechanism 123 will remain operational until the web browser user decides to quit web browser 122 (step 540=YES).

As long as the user continues to use web browser 122 (step 540=NO), bookmark staging mechanism 123 will remain active and web browser 122 will cycle through the step contained within main event loop 580. As part of this process, bookmark staging mechanism 123 will sort the staged bookmarks according to the user's preferences (step 530). Step 530 is explained in more detail in FIG. 7 below. Standard processing (step 535) refers to all of the standard functions associated with web browser 122 such as scrolling, window updating, searching for new URLs, etc.

When the web browser user is going to quit web browser 122 (step 540=YES), bookmark staging mechanism 123 will check bookmark staging area 220 to determine whether or not any changes have been made to staged bookmarks 225 (step 550). If the user has made any changes, such as promoting bookmarks, replacing staged bookmarks, etc. (step 550=YES), then bookmark staging mechanism 123 will issue a warning to the user (step 555). This warning will alert the user that changes have been made and that the changes will be lost if the user does not save the staging area. The user can opt to save the altered staging area 220 (step 560=YES) in which case bookmark staging mechanism 123 will save the changes out to memory 120. Alternatively, the user may choose to discard the changes in which case the changes will not be saved and bookmark staging mechanism 123 will end (step 570). Similarly, if no changes have been made to bookmark staging area 220 (step 550=NO), then bookmark staging mechanism 123 will simply end when the user quits web browser 122 (step 570).

Figure 6:
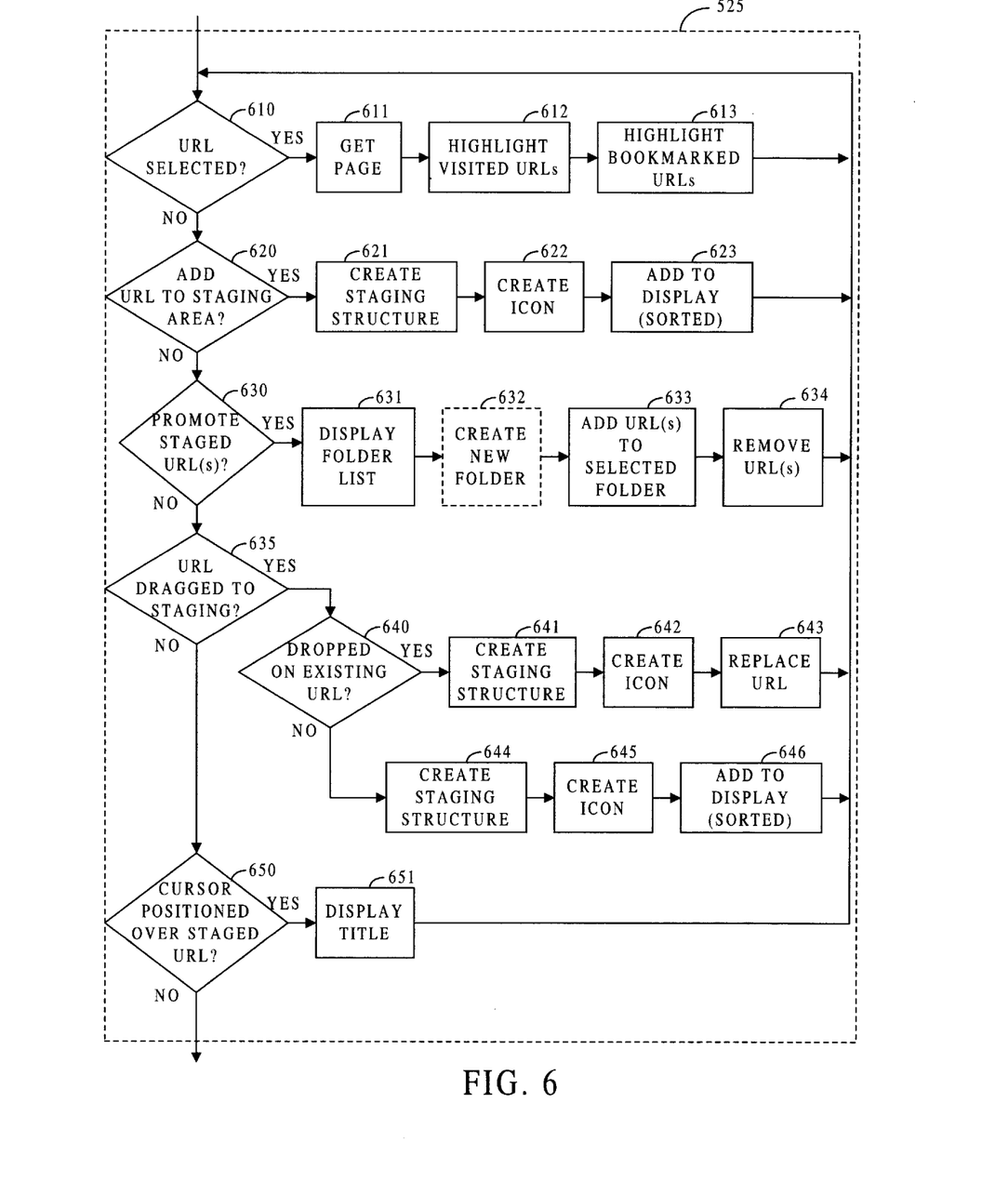
FIG. 6 is an expanded flow diagram of step 530 from the method of FIG. 5.

Referring now to FIG. 6, step 525 from FIG. 5 is explained in greater detail. As shown in FIG. 6, bookmark staging mechanism 123 repeatedly performs a series of checks to monitor changes to bookmark staging area 220 based on the actions of the user of the web browser. First, bookmark staging mechanism 123 will determine if the user has selected a URL for viewing (step 610). If the user has selected a URL (step 610=YES), then the web browser will retrieve the page associated with the URL (step 611). Bookmark staging mechanism 123 will highlight previously-visited URLs in one specific color (step 612) and highlight any URLs which are already permanent URLs in yet another color (step 613). These two steps will allow the user of web browser 122 to know that these highlighted URLs have already been visited and will allow the user to make better decisions about which URLs to bookmark and will also help to prevent redundant bookmarks.

If a selected URL is to be added to bookmark staging area 220 (step 620=YES), then bookmark staging mechanism 123 will create a new staging structure or record 310 in memory 120 (step 621), create an icon to represent the selected URL (step 622), and add the icon to staging area 220 with the icons sorted according to a user-selectable criteria or sorting preference (step 623). The method for implementing the user-selectable sorting methodology is explained in conjunction with FIG. 7 below.

At some point during the browsing session, the user of the web browser may decide to promote one or more of the staged bookmarks to the regular bookmark menu (step 630=YES). As is well known to those skilled in the art, bookmarks are typically stored in folders with related bookmarks being stored in the same folder. Given this option, many users prefer to arrange and organize their bookmarks in this fashion. As shown in FIG. 6, bookmark staging mechanism 123 will display a bookmark folder list (step 631), allowing the web browser user to select an existing folder in which to place the promoted bookmarks. The user may optionally decide to create a new folder for the promoted bookmarks (step 632). In any event, the user will then select the appropriate folder for the bookmarks and add the URL(s) to the selected folder (step 633). After the URL has been added to the appropriate folder, the URLs are removed from bookmark staging area 220 and the associated record 310 in memory 120 is deleted (step 634).

If the user drags a URL to bookmark staging area 220 (step 635=YES), then this is interpreted by bookmark staging mechanism 123 that the URL is to become a staged bookmark 225. Further, bookmark staging mechanism will check to see if the new URL to be added to bookmark staging area 220 is being placed onto or dropped onto an existing staged bookmark 225 (step 640). If it is (step 640=YES), then bookmark staging mechanism will create a new staging structure or record 310 in memory 120 (step 641), create an icon to represent the selected URL (step 642), and replace the existing URL (step 643).

If the new URL is not placed onto an existing URL then bookmark staging mechanism will create a new staging structure or record 310 in memory 120 (step 644), create an icon to represent the selected URL (step 645), and add the icon to staging area 220 with the icons sorted according to a user-selectable criteria or sorting preference (step 646).

Finally, bookmark staging mechanism 123 will monitor the position of the cursor relative to staged bookmarks 225 in bookmark staging area 220 (step 650). If the user positions the cursor over a staged bookmark 225 in bookmark staging area 220 (step 650=YES), them bookmark staging mechanism 123 will display the title of the web page associated with the icon beneath the cursor (step 651). This will allow the user to quickly and easily identify the various staged bookmarks 225 and return to staged bookmarks 225 that are stored in bookmark staging area 220. As previously noted, depending on the user-configurable options, the URL of a given staged bookmark 225 could be displayed at step 651 instead of the title.

It should be noted that if the web browser user is not performing any of the actions depicted in FIG. 6 (steps 610, 620, 630, 635 and 650=NO), then bookmark staging mechanism 123 will cycle through the other steps shown in event loop 580 of FIG. 5. This includes determining if the user is going to quit web browser 122 (step 540 of FIG. 5) and standard processing (step 535 of FIG. 5). As shown in FIGS. 5 and 6, using event loop 580, bookmark staging mechanism 123 will return to step 525 and continue to process bookmarks in accordance with the event loop depicted in FIG. 6 until the user decides to quit web browser 122 (step 540= YES). In addition, steps 621, 641, and 644 all produce a timestamp which is entered into the appropriate record 310 in memory 120 for the selected URL.

Figure 7:
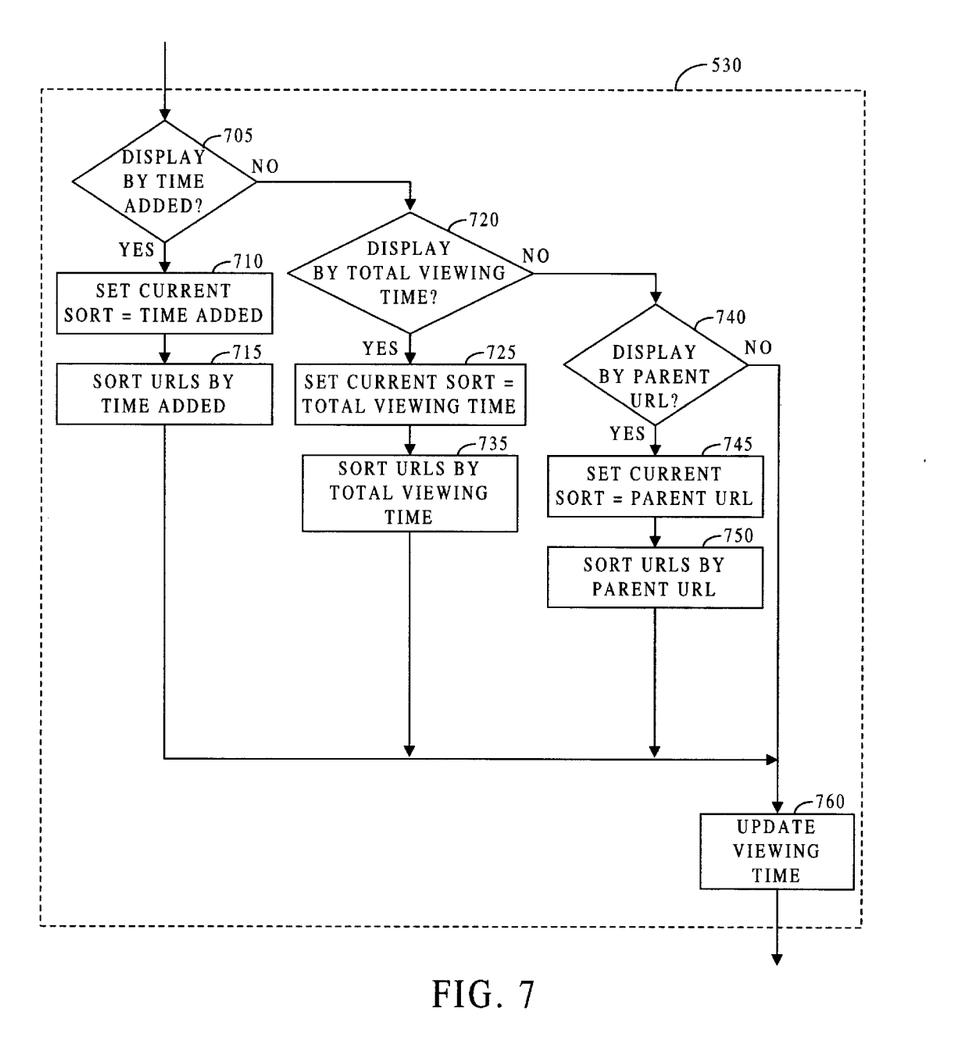
FIG. 7 is a flow diagram for sorting URLs in the bookmark staging area according to a preferred embodiment of the present invention.

Referring now to FIG. 7, method step 530 of FIG. 5 is further illustrated and explained. As shown in FIG. 7, staged bookmarks can be sorted by time added (step 705), total time viewed (step 720), or by parent URL (step 740). Even if no special sorting procedure is requested by the web browser user (step 705, 720, and 740=NO), bookmark staging mechanism 123 will still continually update the viewing time of the appropriate filed in record 310 (step 760) as part of completing step 530 in main event loop 580 as depicted in FIG. 5. If the web browser specifies a specific sort, then bookmark staging mechanism 123 will set the current sort to the specified criteria (steps 710, 725, or 745) and sort the URLs accordingly (steps 715, 735, or 750) and update the viewing time for the appropriate bookmark. Those skilled in the art will readily recognize that the sorting criteria shown in FIG. 7 are not exhaustive and that other sorting criteria may be added as desired.

Figure 8:
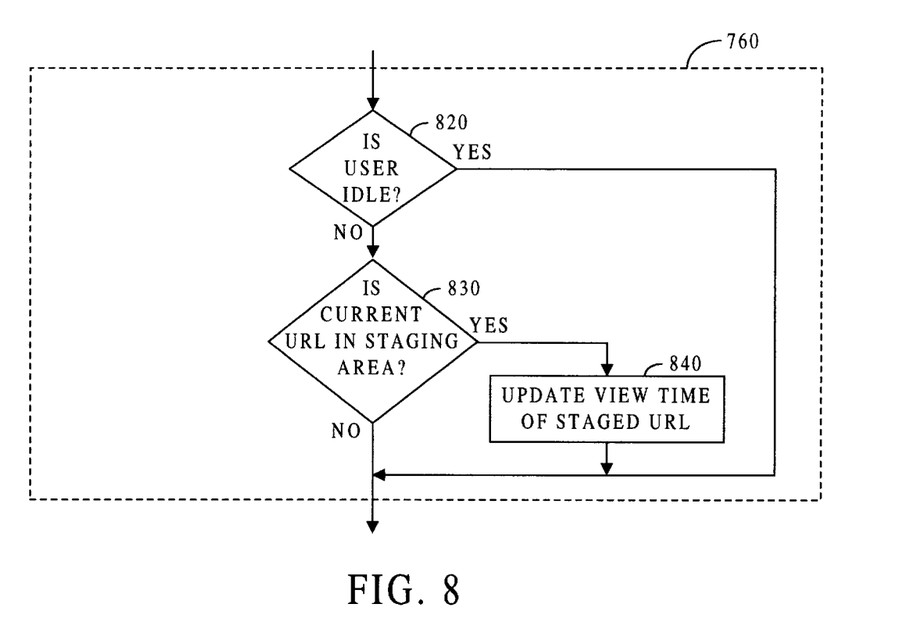
FIG. 8 is a flow diagram for updating the viewing times of URLs in the bookmark staging area according to a preferred embodiment of the present invention.

Referring now to FIG. 8, step 760 of FIG. 7 is explained and illustrated in greater detail. In order to update the viewing time, it is necessary for the system to determine when a user is idle and whether or not the user is viewing a URL that is maintained in bookmark staging area 220. As shown in FIG. 8, bookmark staging mechanism 123 will first determine if the user is idle (step 820). The methodology for making this determination is explained in conjunction with FIG. 9 below. If the user is not idle (step 820=NO), bookmark staging mechanism 124 will next check to see if the current URL is already located in bookmark staging area 220 (step 830). This can be determined by examining all records 310 contained in bookmark staging memory 124. If the current URL is in bookmark staging area 220 (step 830= YES), then the view time of the staged URL will be updated in the appropriate record 310 in bookmark staging memory 124. In either case, if the user is idle (step 820=YES); or if the user is idle and the current URL is not in staging area 820 (steps 820 and 830 both=NO), then the system will return and continue processing in main event loop 580 of FIG. 5.

Figure 9:
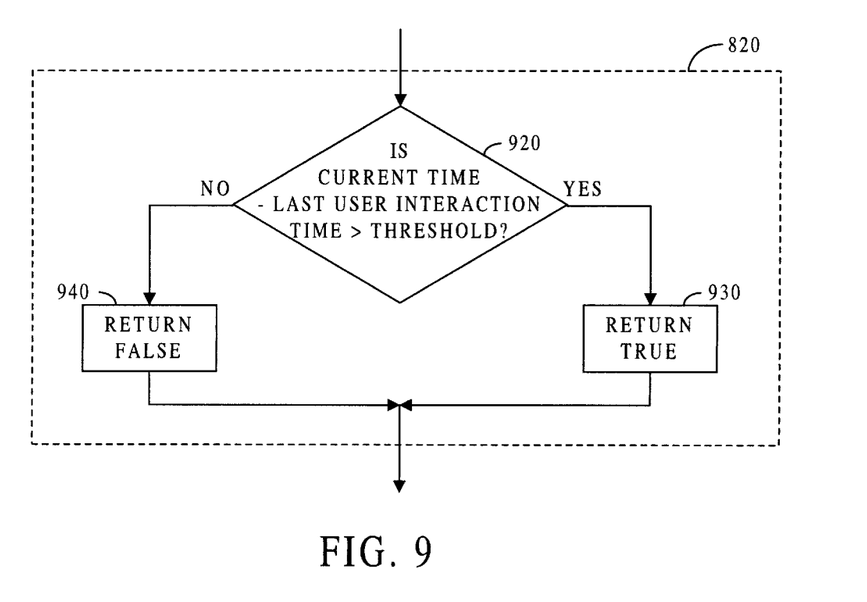
FIG. 9 is a flow diagram for testing user idle time according to a preferred embodiment of the present invention.

Referring now to FIG. 9, the method steps for step 820 of FIG. 8 are shown. As shown in FIG. 9, if there is no interaction between the viewer and web browser 122, the system will need to determine if the user is idle. In this case, bookmark staging mechanism 123 will check to see if the system has been idle long enough to reach the predetermined idle threshold set in the system. This procedure is accomplished by obtaining the current system time from the system, subtracting the last user interaction time from the current time and comparing the result with the predetermined idle threshold time (step 920). If the idle time is greater than the predetermined idle threshold time (step 920=YES), then bookmark staging mechanism will return a value of TRUE to method 800 in step 820. Alternatively, if the idle time has not exceeded the idle threshold time (step 920=NO), then bookmark staging mechanism will return a value of FALSE to method 800 in step 820. Those skilled in the art will recognize that the idle threshold time can be set at whatever level is appropriate for a given system.

Figure 10:
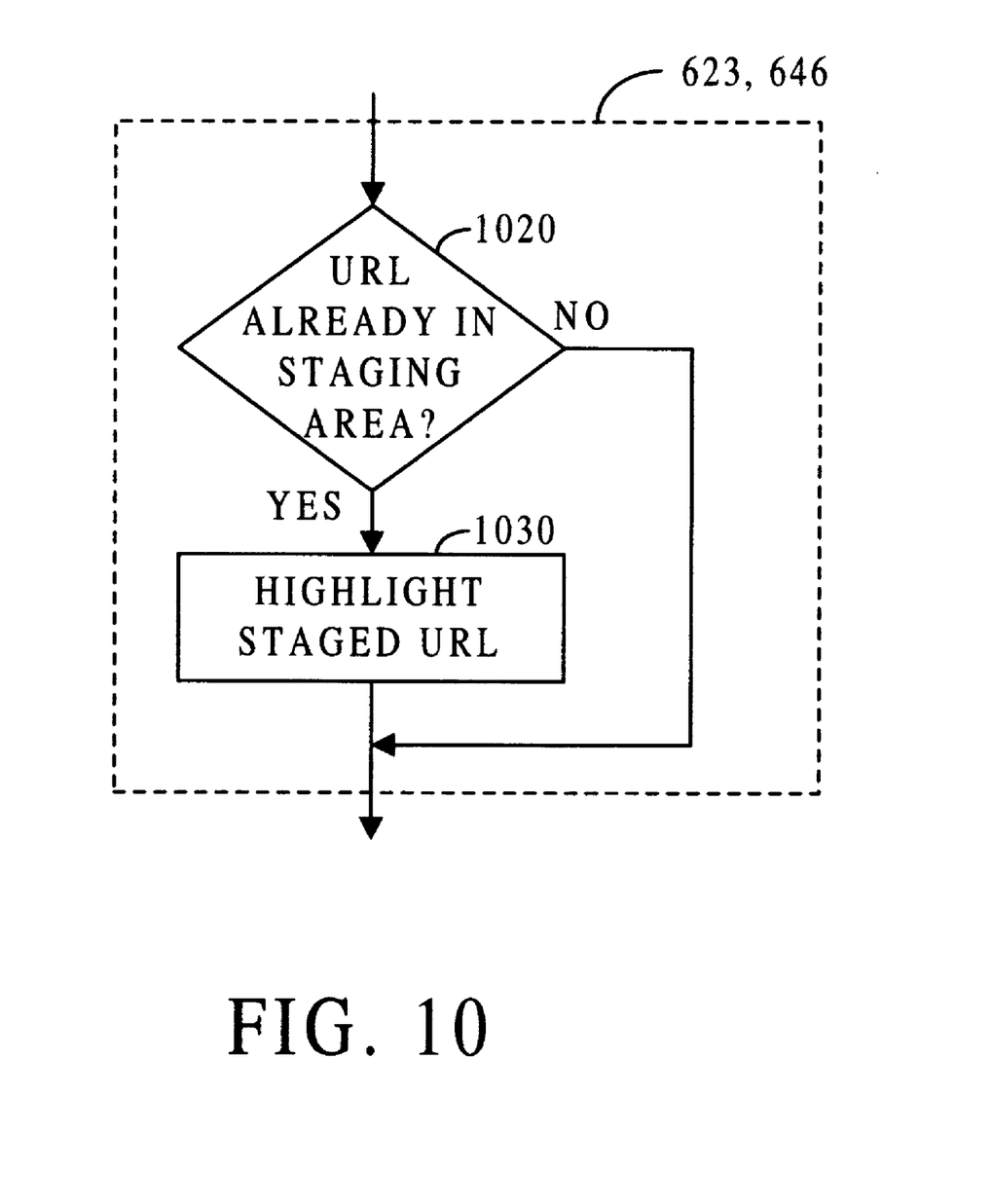
FIG. 10 is a flow diagram for highlighting URLs in the bookmark staging area according to a preferred embodiment of the present invention.

Referring now to FIG. 10, method steps 623 and 646 of FIG. 6 are explained and illustrated in greater detail. As shown in FIG. 10, if a selected URL is already a staged bookmark in bookmark staging area 220, the URL will not be added again to bookmark staging area 220. Instead, the selected URL will simply be highlighted.

Although some existing web browsers provide for the automatic continual caching of recently visited web pages in a first-in-first-out manner, no known web browser provides for the selective addition of bookmarks to a staging area and overall control of the contents of the staging area, based on user input. In addition, no web browser provides for a graphical iconic display of staged bookmarks with the ability to sort the staged bookmarks based on user preference and optionally display information regarding the staged bookmarks such as title, parent URL, time the staged bookmark was added to the staging area, total time the web page has been viewed, etc. These features, and the other features described above, provide a level of functionality that will enable web browser user to more effectively manage and utilize the bookmark capabilities of any web browser.

While the invention has been particularly shown and described with reference to preferred exemplary embodiments thereof, it will be understood by those skilled in the art hat various changes in form and details may be made therein without departing from the scope of the invention.

What is claimed is:

1. An apparatus comprising:
   at least one processor,
   a memory coupled to the at least one processor; and
   a bookmark staging mechanism residing in the memory, the bookmark staging mechanism creating at least one staged bookmark in a bookmark staging area in response to a user input, and wherein the bookmark staging mechanism, when ending a browsing session, provides the option of saving the at least one staged bookmark and deletes at least one staged bookmark if the option of saving the at least one staged bookmark is not chosen.

2. The apparatus of claim 1 wherein the bookmark staging mechanism promotes the at least one staged bookmark from the bookmark staging area to a bookmark folder.

3. The apparatus of claim 1 wherein the at least one staged bookmark comprises an icon portion and a uniform resource locator portion, wherein the uniform resource locator portion specifies a location for a world wide web page.

4. The apparatus of claim 1 wherein the bookmark staging mechanism creates at least one record in the memory, wherein the at least one record contains a plurality of fields describing the at least one staged bookmark.

5. The apparatus of claim 4 wherein at least one of the plurality of fields provides a link to a parent URL for the at least one staged bookmark.

6. The apparatus of claim 1 wherein the bookmark staging mechanism monitors the position of a cursor and provides a title to describe the at least one staged bookmark when the cursor is positioned over the at least one staged bookmark.

7. The apparatus of claim 1 further comprising a plurality of staged bookmarks in the bookmark staging area and a plurality of records in the memory with each of the plurality of records containing information about one of the plurality of staged bookmarks, wherein the bookmark staging mechanism sorts the plurality of staged bookmarks in the bookmark staging area according to a user-selectable criteria.

8. The apparatus of claim 7 wherein the user-selectable criteria comprises a timestamp contained in each of the plurality of records.

9. The apparatus of claim 7 wherein the user-selectable criteria comprises a total viewing time for each of the plurality of staged bookmarks as contained in each of the plurality of records.

10. The apparatus of claim 7 wherein the user-selectable criteria comprises a parent URL field in each of the plurality of records.

11. The apparatus of claim 1 wherein the bookmark staging mechanism, when ending the browsing session, saves the at least one staged bookmark if the option of saving the at least one staged bookmark is chosen.

12. An apparatus comprising:
    at least one processor;
    a memory coupled to the at least one processor;
    a plurality of permanent bookmarks residing in the memory; and
    a bookmark staging mechanism residing in the memory, the bookmark staging mechanism creating a plurality of records in the memory in response to a user input, wherein each of the plurality of records contains a plurality of fields, the bookmark staging mechanism using the plurality of fields to create a plurality of staged bookmarks in a bookmark staging area, wherein the bookmark staging mechanism promotes one of the staged bookmarks to a permanent bookmark when directed by a user to do so, and wherein the bookmark staging mechanism, when ending a browsing session, provides the option of saving the bookmark staging area and deletes the bookmark staging area if the option of saving the bookmark staging area is not chosen and saves the bookmark staging area if the option of saving the bookmark staging area is chosen.

13. The apparatus of claim 12 wherein each of the plurality of staged bookmarks comprises an icon portion and a uniform resource locator portion, wherein the uniform resource locator portion specifies a location for a world wide web page.

14. The apparatus of claim 12 wherein at least one of the plurality of fields provides a link to a parent URL for the at least one of the plurality of staged bookmarks.

15. The apparatus of claim 12 wherein the bookmark staging mechanism sorts the plurality of staged bookmarks according to a user-selectable criteria.

16. The apparatus of claim 15 wherein the user-selectable criteria comprises a timestamp contained in each of the plurality of records.

17. The apparatus of claim 15 wherein the user-selectable criteria comprises a total viewing time for each of the plurality of staged bookmarks as contained in each of the plurality of records.

18. The apparatus of claim 15 wherein the user-selectable criteria comprises a parent URL field in each of the plurality of records.

19. A method comprising the steps of:
    starting a browsing session;
    performing the following steps during the browsing session:
       creating at least one staged bookmark record in a memory location in response to a user input, the at least one record comprising a plurality of fields which describe a world wide web page; and
       creating at least one staged bookmark in a bookmark staging area to represent the world wide web page based on the plurality of fields in the at least one record: and
    performing the following steps when ending the browsing session:
       providing the option of saving the bookmark staging area; and
       deleting the at least one staged bookmark if the option of saving the bookmark staging area is not chosen.

20. The method of claim 19 further comprising the step of using the plurality of fields to create a permanent bookmark entry from the at least one staged bookmark.

21. The method of claim 19 further comprising the step of replacing the at least one staged bookmark with a new staged bookmark when a user drags a uniform resource locator onto the at least one bookmark in the bookmark staging area.

22. The method of claim 19 further comprising the step of displaying an icon portion and a uniform resource locator portion to represent the at least one staged bookmark in the bookmark staging area.

23. The method of claim 19 further comprising the steps of creating a plurality of staged bookmarks in the bookmark staging area and wherein the bookmark staging mechanism sorts the plurality of staged bookmarks according to a user-selectable criteria.

24. The method of claim 23 wherein the user-selectable criteria comprises a timestamp contained in each of the plurality of records.

25. The method of claim 23 wherein the user-selectable criteria comprises a total viewing time for each of the plurality of staged bookmarks as contained in each of the plurality of records.

26. The method of claim 23 wherein the user-selectable criteria comprises a parent URL field in each of the plurality of records.

27. The method of claim 19 wherein the step of performing the following steps when ending the browsing session further comprises the step of saving the at least one staged bookmark if the option of saving the bookmark staging area is chosen.

28. A method for creating a plurality of staged bookmarks, the method comprising the steps of:

creating at least one bookmark staging record in a memory location in response to a user input, each of the at least one bookmark staging records comprising a plurality of fields, and wherein each of the at least one bookmark staging records describe one of a plurality of world wide web pages;

providing a plurality of permanent bookmarks;

promoting one of the at least one bookmark staging records to a permanent bookmark; and performing the following steps when ending a browsing session:

providing the option of saving the at least one bookmark staging record;

deleting all of the at least one bookmark staging records if the option of saving the bookmark staging area is not chosen; and saving all of the at least one bookmark staging records if the option of saving the bookmark staging area is chosen.

29. The method of claim 28 further comprising the steps of:

creating a plurality of icons in a bookmark staging area, wherein each of the plurality of icons represents one of the plurality of world wide web pages; and sorting the plurality of icons according to a user-selectable criteria.

30. The method of claim 29 wherein the user-selectable criteria comprises a timestamp contained in each of the plurality of records.

31. The method of claim 29 wherein the user-selectable criteria comprises a viewing time for each of the world wide web pages.

32. The method of claim 29 wherein the user-selectable criteria comprises a parent URL field in each of the plurality of records.

33. The method of claim 29 wherein the step of creating a plurality of icons in a bookmark staging area comprises the step of repeatedly navigating to a world wide web page and selecting an item from a pop-up menu.

34. The method of claim 29 wherein the step of creating a plurality of icons in a bookmark staging area comprises the step of repeatedly dragging a uniform resource locator to the bookmark staging area.

35. A program product comprising:

a bookmark staging mechanism, the bookmark staging mechanism creating at least one staged bookmark in a bookmark staging area to represent a staged bookmark in response to a user input, wherein the bookmark staging mechanism promotes one of the at least one staged bookmarks to a permanent bookmark when directed by a user to do so, and wherein the bookmark staging mechanism, when ending a browsing session, provides the option of saving the bookmark staging area and deletes the bookmark staging area if the option of saving the bookmark staging area is not chosen and saves the bookmark staging area if the option of saving the bookmark staging area is chosen; and signal bearing media bearing the bookmark staging mechanism.

36. The program product of claim 35 wherein the signal bearing media comprises transmission media.

37. The program product of claim 35 wherein the signal bearing media comprises recordable media.

38. The program product of claim 35 wherein the bookmark staging mechanism replaces the at least one staged bookmark with a new staged bookmark when a uniform resource locator is placed over the at least one staged bookmark.

39. The program product of claim 35 wherein the at least one staged bookmark is a plurality of staged bookmarks and wherein the bookmark staging mechanism sorts the plurality of staged bookmarks according to a user-selectable criteria.

40. The program product of claim 39 wherein the user-selectable criteria comprises a timestamp contained in each of the plurality of records.

41. The program product of claim 39 wherein the user-selectable criteria comprises a total viewing time for each of the plurality of staged bookmarks as contained in each of the plurality of records.

42. The program product of claim 39 wherein the user-selectable criteria comprises a parent URL field in each of the plurality of records.

43. A web browser residing in a memory and being executed by a processor, the web browser comprising:

a plurality of permanent bookmarks;

a bookmark staging area;

a bookmark staging mechanism; and a plurality of icons being placed in the bookmark staging area by the bookmark staging mechanism in response to a series of user inputs, wherein each of the plurality of icons represents one of a plurality of staged bookmarks and wherein each of the staged bookmarks represents one of a plurality of world wide web pages, wherein the bookmark staging mechanism promotes one of the staged bookmarks to a permanent bookmark when directed by a user to do so, and wherein the bookmark staging mechanism, when ending a browsing session, provides the option of saving the bookmark staging area and deletes the bookmark staging area if the option of saving the bookmark staging area is not chosen and saves the bookmark staging area if the option of saving the bookmark staging area is chosen.

44. The web browser of claim 43 wherein the bookmark staging mechanism creates at least one record in the memory, the at least one record containing a plurality of fields which contain information about at least one of the plurality of staged bookmarks.

45. The web browser of claim 43 wherein the bookmark staging mechanism creates each of the plurality of icons in the bookmark staging area in response to a user input consisting of selecting an item from a pull-down menu.

46. The web browser of claim 43 wherein the bookmark staging mechanism creates each of the plurality of icons in the bookmark staging area in response to a user input consisting of dragging a URL to the bookmark staging area.

47. The web browser of claim 43 wherein the bookmark staging mechanism replaces at least one of the plurality of icons in the bookmark staging area when a user drags a uniform resource locator over the at least one of the plurality of icons.

48. The web browser of claim 43 wherein the bookmark staging mechanism sorts the plurality of icons in the bookmark staging area according to a user-selectable criteria.

49. The web browser of claim 48 wherein the user-selectable criteria comprises a timestamp specifying when each of the plurality of icons was placed into the bookmark staging area.

50. The web browser of claim 48 wherein the user-selectable criteria comprises a total viewing time for each of the plurality of world wide web pages which is represented by each of the plurality of icons.

51. The web browser of claim 48 wherein the user-selectable criteria comprises a parent uniform resource locator for each of the plurality of world wide web pages.

* * * * *